United States Patent
Osawa et al.

(10) Patent No.: US 9,734,818 B2
(45) Date of Patent: Aug. 15, 2017

(54) INFORMATION PROVIDING DEVICE AND INFORMATION PROVIDING METHOD

(71) Applicant: MITSUBISHI ELECTRIC CORPORATION, Tokyo (JP)

(72) Inventors: Masanobu Osawa, Tokyo (JP); Yohei Okato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/120,966

(22) PCT Filed: Apr. 15, 2014

(86) PCT No.: PCT/JP2014/060710
§ 371 (c)(1),
(2) Date: Aug. 23, 2016

(87) PCT Pub. No.: WO2015/159363
PCT Pub. Date: Oct. 22, 2015

(65) Prior Publication Data
US 2016/0365086 A1    Dec. 15, 2016

(51) Int. Cl.
*G06F 17/27*    (2006.01)
*G10L 13/08*    (2013.01)
*G10L 13/04*    (2013.01)

(52) U.S. Cl.
CPC .......... *G10L 13/08* (2013.01); *G06F 17/2705* (2013.01); *G06F 17/2765* (2013.01); *G06F 17/2785* (2013.01); *G06F 17/2795* (2013.01); *G06F 17/274* (2013.01); *G10L 13/043* (2013.01)

(58) Field of Classification Search
CPC .............. G06F 17/2785; G06F 17/274; G06F 17/2872; G06F 17/289; G10L 13/07; G10L 13/08; G10L 13/043
See application file for complete search history.

(56) References Cited

U.S. PATENT DOCUMENTS 6,751,592 B1    6/2004    Shiga
2002/0120451 A1    8/2002    Kato et al.

FOREIGN PATENT DOCUMENTS

| CN | 1328321 A | 12/2001 |
|---|---|---|
| CN | 101819469 A | 9/2010 |
| JP | 3-35296 A | 2/1991 |
| JP | 2000-172289 A | 6/2000 |
| JP | 2000-206982 A | 7/2000 |
| JP | 2003-302993 A | 10/2003 |

OTHER PUBLICATIONS

Office Action dated Mar. 10, 2017 in corresponding Chinese Application No. 201480078015.6 with an English Translation.

*Primary Examiner* — Vu B Hang
(74) *Attorney, Agent, or Firm* — Birch, Stewart, Kolasch & Birch, LLP

(57) ABSTRACT

A detector 5 detects words acoustically similar to each other from text information, and a selector 7 selects a synonym from a storage 6, the synonym corresponding to a word detected by the detector 5 and being acoustically neither the same as nor similar to any word existing in the text information. A replacer 8 replaces the word detected by the detector 5 with the synonym selected by the selector 7.

5 Claims, 4 Drawing Sheets

| Word | Synonym 1 | Synonym 2 | ... |
|---|---|---|---|
| Tensaku (Correction) | Teisei (Amendment) | Tenaosi (Modification) | |
| Giniro (Silver) | Sirubaa (Silver) | Siroganeiro (Silver) | |
| Kiniro (Gold) | Goorudo (Gold) | Koganeiro (Gold) | |
| ... | ... | ... | ... |

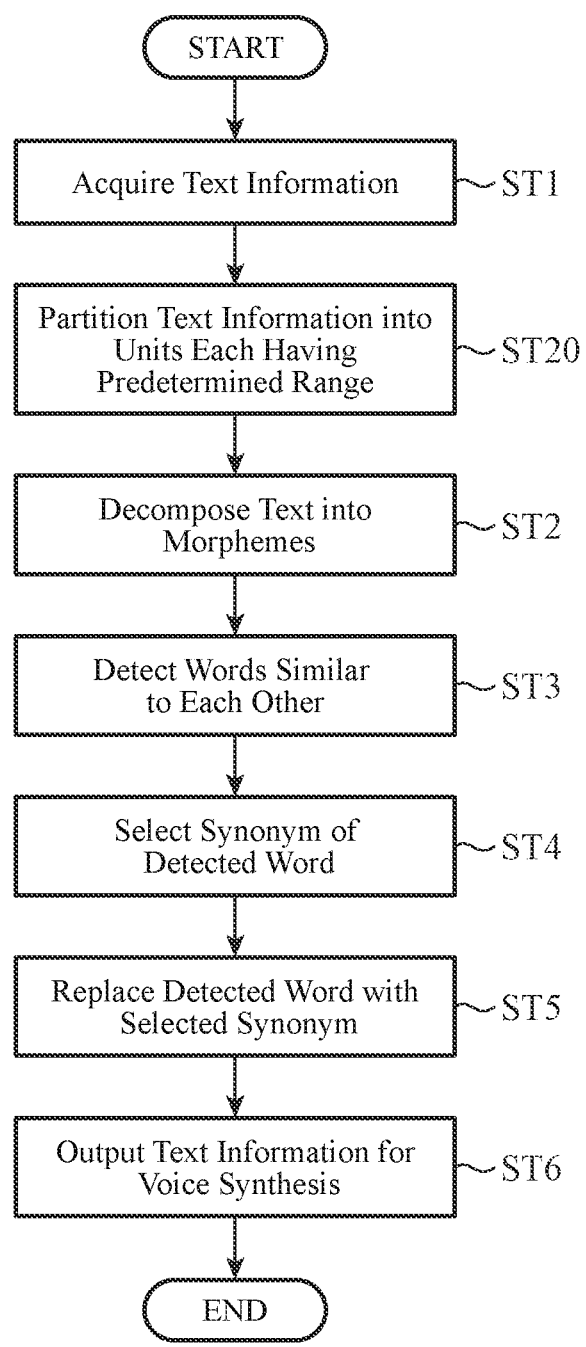

US 9,734,818 B2

INFORMATION PROVIDING DEVICE AND INFORMATION PROVIDING METHOD

FIELD OF THE INVENTION

The present invention relates to an information providing device for and an information providing method of providing a voice synthesis device with text information for voice synthesis.

BACKGROUND OF THE INVENTION

Conventionally, there is a problem that when there exist, in a text inputted to a voice synthesis device, words which are acoustically similar to each other and are easily misheard, the intelligibility of the synthesized voice becomes low.

Patent reference 1 describes a technique of, when words similar to each other in pronunciation exist in a text which is a target for voice synthesis, improving its intelligibility by using a voice segment having a high degree of clarity when generating a synthesized voice of the words. However, because only the degree of clarity becomes high in this case, there is a possibility that when, for example, the noise level becomes large, the user mishears the synthesized voice.

On the other hand, patent reference 2 describes a technique of replacing a word in a text which is a target for voice synthesis with another plain expression.

RELATED ART DOCUMENT

Patent Reference

Patent reference 1: Japanese Unexamined Patent Application Publication No. 2000-206982
Patent reference 2: Japanese Unexamined Patent Application Publication No. 3-35296

SUMMARY OF THE INVENTION

Problems to be Solved by the Invention

There is considered a technique of, in order to solve the problem in patent reference 1, combining patent references 1 and 2, and, when words similar to each other in pronunciation exist in a text, replacing the words with other expressions. A problem is however that because a relation between the expression after replacement and the other words in the text is not taken into consideration, a synthesized voice having low intelligibility is generated on the contrary.

The present invention is made in order to solve the above-mentioned problem, and it is therefore an object of the present invention to provide a technique of replacing a word in consideration of a relation with other words in a text.

Means for Solving the Problem

According to the present invention, there is provided an information providing device including: an acquirer to acquire text information; a detector to detect words acoustically similar to each other from the text information; a storage to store a synonym which is brought into correspondence with each of words in advance; a selector to select a synonym from the storage, the synonym corresponding to a word detected by the detector and being acoustically neither the same as nor similar to any word existing in the text information; a replacer to replace the word detected by the detector with the synonym selected by the selector; and an outputter to output the text information after being replaced by the replacer as text information for voice synthesis.

According to the present invention, there is provided an information service method including the steps of: in an acquirer, acquiring text information; in a detector, detecting words acoustically similar to each other from the text information; in a selector, selecting a synonym from synonyms which are respectively brought into correspondence with words in advance, the synonym corresponding to a word detected in the detecting step and being acoustically neither the same as nor similar to any word existing in the text information; in a replacer, replacing the word detected in the detecting step with the synonym selected in the selecting step; and in an outputter, outputting the text information after being replaced in the replacing step as text information for voice synthesis.

Advantages of the Invention

According to the present invention, because a synonym being acoustically neither the same as nor similar to any word existing in the text information is selected and replaced, text information for synthesized voice which is used to generate a synthesized voice having high intelligibility can be generated.

BRIEF DESCRIPTION OF THE FIGURES

FIG. 5 is a flow chart showing the operation of the information providing device according to Embodiment 2.

EMBODIMENTS OF THE INVENTION

Hereafter, in order to explain this invention in greater detail, the preferred embodiments of the present invention will be described with reference to the accompanying drawings.

Embodiment 1

Figure 1:
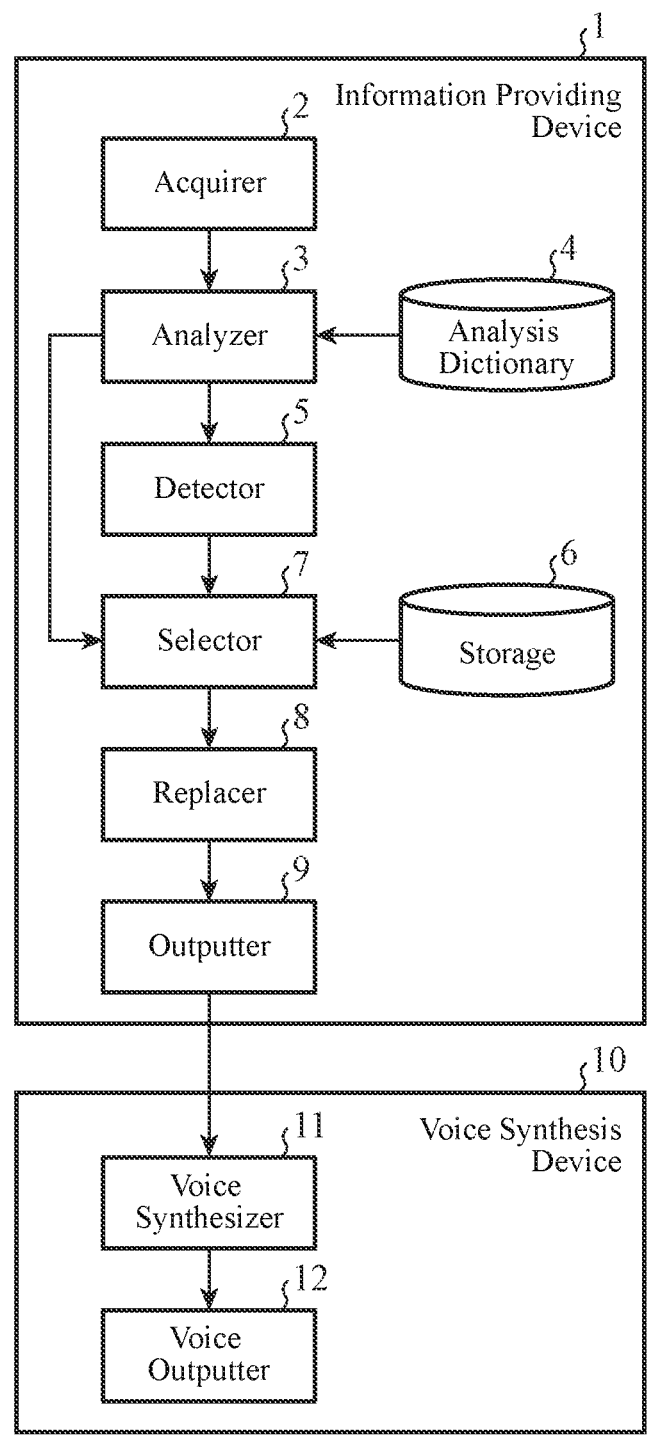
FIG. 1 is a block diagram showing the configurations of an information providing device and a voice synthesis device according to Embodiment 1 of the present invention.

FIG. 1 is a block diagram showing the configurations of an information providing device 1 according to Embodiment 1 and a voice synthesis device 10 that generates a synthesized voice by using text information for voice synthesis which is outputted from the information providing device 1. This information providing device 1 can be applied to a navigation device or a server device, or can be an application program installed in a mobile information terminal, such as a tablet PC (personal computer) or a mobile phone.

The information providing device 1 includes an acquirer 2, an analyzer 3, an analysis dictionary 4, a detector 5, a storage 6, a selector 7, a replacer 8 and an outputter 9.

The acquirer 2 acquires text information which is a target for processing performed by this information providing device 1 from outside the information providing device.

The analyzer 3 refers to the analysis dictionary 4 and performs a morphological analysis on the text information acquired by the acquirer 2, to decompose the text into morphemes. Because a well-known technique can be used as a method of performing a morphological analysis, the explanation of the method will be omitted hereafter.

The detector 5 detects words which are acoustically similar to each other from the text information by using an analysis result acquired by the analyzer 3. Although a detailed explanation of a method of determining whether or not words are acoustically similar to each other will be omitted hereafter because a well-known technique can be used as the method, there is, for example, a method of calculating the degree of similarity between phonemes by using Confusion Matrix, and calculating and determining the degree of similarity between words on the basis of the degree of similarity.

The storage 6 stores words and synonyms which are defined in advance while bringing each of the words into correspondence with synonyms.

Figures 2, 3:
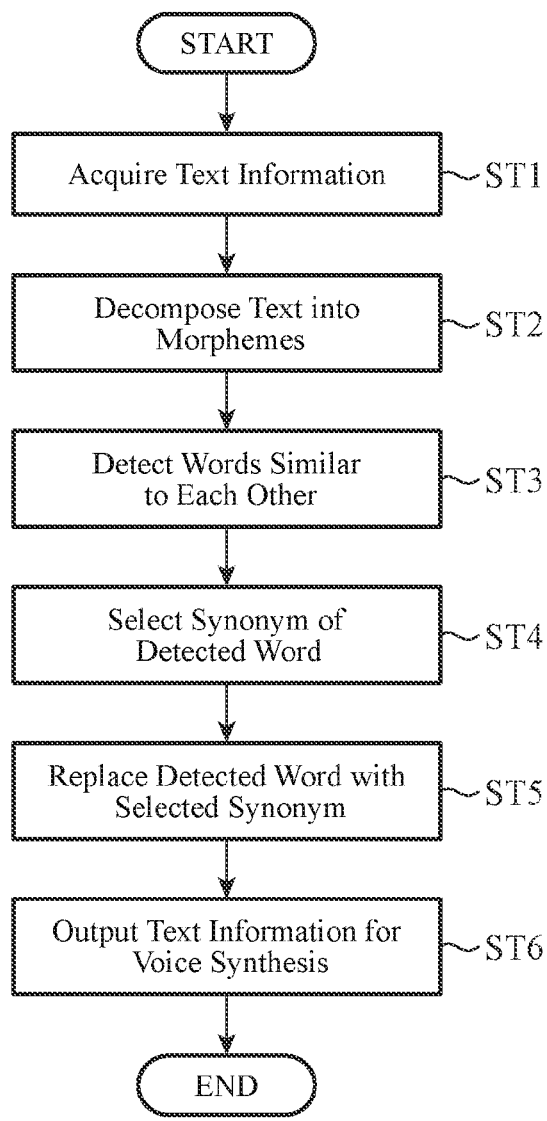
FIG. 2 is a diagram showing an example of words and synonyms which are stored in a storage of the information providing device according to Embodiment 1.
FIG. 3 is a flow chart showing the operation of the information providing device according to Embodiment 1.

An example of the words and the synonyms which the storage 6 stores is shown in FIG. 2. For example, a word "tensaku (correction)" is brought into correspondence with synonyms "teisei (amendment)" and "tenaosi (modification)."

The selector 7 selects a synonym corresponding to a word detected by the detector 5 from the storage 6. At that time, the selector 7 selects a synonym which is acoustically neither the same as nor similar to any word existing in the text information by using the analysis result acquired by the analyzer 3.

When there are a plurality of synonym candidates satisfying the above-mentioned condition, the selector 7 can select a synonym having a smaller number of phonemes. Because a synonym having a small number of phonemes has a short pronunciation, such a synonym is easily heard even under noise and its intelligibility is good when it is outputted as a synthesized voice.

In addition, the selector 7 does not have to select a synonym for every word detected by the detector 5. For example, when two words similar to each other are detected by the detector 5, the selector can simply select a synonym for one of the words, but does not have to select a synonym for the other word. Further, for example, the selector can simply select a synonym having a smaller number of phonemes from two synonyms corresponding to the two similar words, but does not have to select the other synonym having a larger number of phonemes.

The replacer 8 replaces a word existing in the text information acquired by the acquirer 2, the word being detected by the detector 5, with a synonym selected by the selector 7.

The outputter 9 outputs the text information after being replaced by the replacer 8 to the voice synthesis device 10 as text information for voice synthesis.

Next, the voice synthesis device 10 will be explained. The voice synthesis device 10 includes a voice synthesizer 11 and a voice outputter 12.

The voice synthesizer 11 generates a synthesized voice from the text information for voice synthesis which the information providing device 1 provides. Because a well-known technique can be used as the voice synthesis, the explanation of the voice synthesis will be omitted hereafter.

The voice outputter 12 commands a not-shown speaker to output the synthesized voice generated by the voice synthesizer 11.

Next, the operation of the information providing device 1 according to Embodiment 1 will be explained using a flow chart shown in FIG. 3 and a concrete example.

In this embodiment, the explanation will be made by assuming that "tensaku no saiwa, heisei wo kensakusite, shoowa ni cikansitekudasai (when making a correction, please search for Heisei and replace Heisei with Shoowa)" is the text information which is the target for processing performed by the information providing device 1, and the storage 6 stores the data as shown in FIG. 2.

First, the acquirer 2 acquires the text information which is the target for processing (step ST1). In this case, the acquirer acquires the above-mentioned text information "tensaku no saiwa, heisei wo kensakusite, shoowa ni cikansitekudasai (when making a correction, please search for Heisei and replace Heisei with Shoowa)."

The analyzer 3 then refers to the analysis dictionary 4 and performs a morphological analysis on the text information acquired by the acquirer 2, to decompose the text into morphemes (step ST2). Next, the detector 5 detects words which are acoustically similar to each other from the text information by using an analysis result acquired by the analyzer 3 (step ST3).

Concretely, the detector 5 detects words "tensaku (correction)" and "kensaku (search)" which are acoustically similar to each other.

After that, the selector 7 selects a synonym of a word detected by the detector 5 from the storage 6 (step ST4).

At that time, the selector 7 determines that synonym candidates for the word "tensaku (correction)" are "teisei (amendment)" and "tenaosi (modification)", but the synonym "teisei (amendment)" is acoustically similar to another word "heisei" in the text information, and selects the synonym "tenaosi (modification)."

Finally, the replacer 8 replaces the word existing in the text information and detected by the detector 5 by the synonym selected by the selector 7 (step ST5), and outputs text information for voice synthesis after replacement to the voice synthesis device 10 via the outputter 9 (step ST6).

Concretely, the replacer 8 replaces "tensaku (correction)" in the text information "tensaku no saiwa, heisei wo kensakusite, shoowa ni cikansitekudasai (when making a correction, please search for Heisei and replace Heisei with Shoowa)" with "tenaosi (modification)", and generates text information after replacement "tenaosi no saiwa, heisei wo kensakusite, shoowa ni cikansitekudasai (when making a modification, please search for Heisei and replace Heisei with Shoowa)."

Although in the above-mentioned explanation a synonym is selected for only "tensaku (correction)" among the acoustically similar words "tensaku (correction)" and "kensaku (search)", in addition to that synonym, a synonym of "kensaku (search)" can also be selected.

Further, although the number of pieces of text information which are the target for processing performed by the information providing device 1 is one, two or more sentences can be set as the target for processing. By determining the acoustical degree of similarity in the combination of two or more sentences when selecting a synonym, the information providing device can generate text information for synthesized voice in which its intelligibility and consistency between the sentences are improved.

As mentioned above, the information providing device 1 according to Embodiment 1 is configured in such a way as to include: the acquirer 2 to acquire text information; the detector 5 to detect words acoustically similar to each other from the text information; the storage 6 to store a synonym which is brought into correspondence with each of words in advance; the selector 7 to select a synonym from the storage 6, the synonym corresponding to a word detected by the detector 5 and being acoustically neither the same as nor similar to any word existing in the text information; the replacer 8 to replace the word detected by the detector 5 with the synonym selected by the selector 7; and the outputter 9 to output the text information after being replaced by the replacer 8 as text information for voice synthesis. Therefore, text information for synthesized voice which is used to generate a synthesized voice having high intelligibility can be generated.

Further, because when a plurality of synonym candidates exist, the selector 7 according to Embodiment 1 selects a synonym having a lower number of phonemes, text information for synthesized voice which is used to generate a synthesized voice having higher intelligibility can be generated.

Embodiment 2

Figure 4:
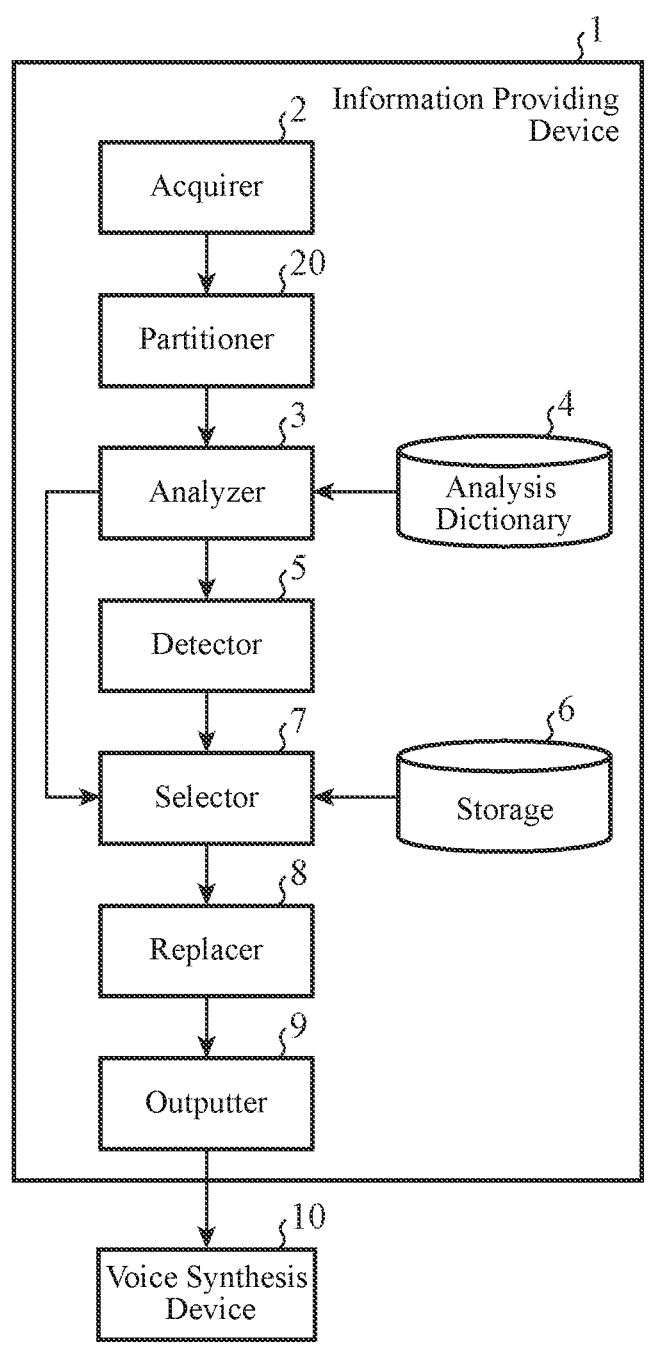
FIG. 4 is a block diagram showing the configuration of an information providing device according to Embodiment 2 of the present invention.

FIG. 4 is a block diagram showing the configuration of an information providing device 1 according to Embodiment 2. In FIG. 4, the same components as those shown in FIGS. 1 and 2 or like components are designated by the same reference numerals, and the explanation of the components will be omitted hereafter. The information providing device 1 according to Embodiment 2 newly includes a partitioner 20 that partitions text information acquired by an acquirer 2 into units each having a predetermined range. Each unit having a predetermined range is a sentence, a paragraph, a file, or the like, and the partitioner 20 performs the partitioning on the basis of additional information added to the text information acquired by the acquirer 2. The additional information shows a separator between sentences, a separator between paragraphs, or the like.

A detector 5, a selector 7 and a replacer 8 process each unit having a predetermined range in the text information after being partitioned by the partitioner 20.

Concretely, the detector 5 detects words acoustically similar to each other from each unit having a predetermined range in the text information by using an analysis result acquired by an analyzer 3. When selecting a synonym corresponding to a word detected by the detector 5 from the storage 6, the selector 7 selects a synonym which is acoustically neither the same as nor similar to any word existing in each unit having a predetermined range in the text information. The replacer 8 replaces the word existing in a unit of a predetermined range in the text information and detected by the detector 5 with the synonym selected by the selector 7. An outputter 9 outputs each unit of a predetermined range in the text information after being replaced to a voice synthesis device 10 as text information for voice synthesis.

Next, the operation of the information providing device 1 according to Embodiment 2 will be explained using a flow chart shown in FIG. 5 and a concrete example.

First, the acquirer 2 acquires the text information which is the target for processing (step ST1). The partitioner 20 partitions the text information into two units, e.g., two sentences, on the basis of the additional information (step ST20). In this case, the explanation will be made by assuming that the text information partitioned into two sentences by the partitioner 20 is "kiniro no isi ga goko, giniro no isi ga ikko hituyodesu (Five gold stones and one silver stone are needed). kiniro wa eigo de goorudo, giniro wa eigo de sirubaa desu (Kiniro means gold in English and giniro means silver in English)", and the storage 6 stores data as shown in FIG. 2.

The analyzer 3 then refers to an analysis dictionary 4 and performs a morphological analysis on the two sentences of the text information partitioned by the partitioner 20, to decompose the text into morphemes (step ST2). Next, the detector 5 searches for words acoustically similar to each other from the two sentences of the text information by using an analysis result acquired by the analyzer 3 (step ST3).

Concretely, the detector 5 detects words "kiniro (gold)" and "giniro (silver)" which are acoustically similar to each other.

After that, the selector 7 selects a synonym of each of the words detected by the detector 5 from the storage 6 (step ST4).

In this embodiment, while the synonym candidates for the word "kiniro (gold)" are "goorudo" and "koganeiro", the selector 7 selects the synonym "koganeiro" because the word "goorudo" exists in the two sentences of the text information. In the same way, the selector 7 selects "siroganeiro" as the synonym of the word "giniro (silver)."

Finally, the replacer 8 replaces the words existing in the two sentences of the text information and detected by the detector 5 with the synonyms selected by the selector 7 (step ST5), and outputs the text information for voice synthesis after replacement to the voice synthesis device 10 via the outputter 9 (step ST6).

Concretely, the replacer 8 replaces "kiniro (gold)" in the two sentences of the text information "kiniro no isi ga goko, giniro no isi ga ikko hituyodesu (Five gold stones and one silver stone are needed). kiniro wa eigo de goorudo, giniro wa eigo de sirubaa desu (Kiniro means gold in English and giniro means silver in English)." with "koganeiro" and also replaces "giniro (silver)" in the two sentences with "siroganeiro", and generates text information after replacement "koganeiro no isi ga goko, siroganeiro no isi ga ikko hituyodesu (Five gold stones and one silver stone are needed). koganeiro wa eigo de goorudo, siroganeiro wa eigo de sirubaa desu (Koganeiro means gold in English and siroganeiro means silver in English)."

As mentioned above, the information providing device 1 according to Embodiment 2 is configured in such a way that the information providing device includes the partitioner 20 that partitions the text information acquired by the acquirer 2 into two or more units such as sentences, and the detector 5 detects words acoustically similar to each other from the units after being partitioned by the partitioner 20 and the selector 7 selects a synonym from the storage 6, the synonym corresponding to a word detected by the detector 5 and being acoustically neither the same as nor similar to any word existing in the units after being partitioned by the partitioner 20. Therefore, the information providing device can generate text information for voice synthesis which is used to generate a synthesized voice having high intelligibility and consistency in each of the units of the text between which there is relevance in terms of their meanings.

Although in above-mentioned Embodiments 1 and 2 the analyzer 3 and the analysis dictionary 4 decompose the text into morphemes, the analyzer 3 and the analysis dictionary 4 can be eliminated in a case in which a morphological analysis result is included in advance in the text information acquired by the acquirer 2.

Further, although the explanation is made in above-mentioned Embodiments 1 and 2 by taking Japanese as an example, the present invention is not limited to this example, and the present invention can be applied to a language other than Japanese.

While the present invention has been described in its preferred embodiments, it is to be understood that, in addition to the above-mentioned embodiments, an arbitrary combination of the embodiments can be made, a change can be made in an arbitrary component according to any one of the embodiments, or an arbitrary component according to any one of the embodiments can be omitted within the scope of the invention.

INDUSTRIAL APPLICABILITY

Because the information providing device according to the present invention generates text information which is used to generate a synthesized voice having high intelligibility, thereby being able to ensure the intelligibility even if the information providing device is influenced by ambient noise such as noise at a time when a vehicle equipped with the information providing device is traveling, the information providing device is suitable for providing a voice synthesis device for car navigation or the like with text information.

EXPLANATIONS OF REFERENCE NUMERALS

1 information providing device, 2 acquirer, 3 analyzer, 4 analysis dictionary, 5 detector, 6 storage, 7 selector, 8 replacer, 10 voice synthesis device, 11 voice synthesizer, 12 voice outputter, and 20 partitioner.

The invention claimed is:

1. An information providing device that provides text information for voice synthesis for a voice synthesis device, said information providing device comprising:
    an acquirer to acquire text information;
    a detector to detect words acoustically similar to each other from said text information;
    a storage to store a synonym which is brought into correspondence with each of words in advance;
    a selector to select a synonym from said storage, said synonym corresponding to a word detected by said detector and being acoustically neither same as nor similar to any word existing in said text information;
    a replacer to replace the word detected by said detector with the synonym selected by said selector; and
    an outputter to output said text information after being replaced by said replacer as said text information for voice synthesis.

2. The information providing device according to claim 1, wherein said information providing device includes a partitioner to partition the text information acquired by said acquirer into two or more units such as sentences, said detector detects words acoustically similar to each other from the units after being partitioned by said partitioner, and said selector selects a synonym from said storage, said synonym corresponding to a word detected by said detector and being acoustically neither same as nor similar to any word existing in the units after being partitioned by said partitioner.

3. The information providing device according to claim 2, wherein said partitioner partitions said text information on a basis of additional information added to said text information.

4. The information providing device according to claim 1, wherein when a plurality of synonym candidates exist, said selector selects a synonym having a lower number of phonemes.

5. An information service method which an information providing device uses to provide a voice synthesis device with text information for voice synthesis, said information service method comprising the steps of:
    in an acquirer, acquiring text information;
    in a detector, detecting words acoustically similar to each other from said text information;
    in a selector, selecting a synonym from synonyms which are respectively brought into correspondence with words in advance, said synonym corresponding to a word detected in said detecting step and being acoustically neither same as nor similar to any word existing in said text information;
    in a replacer, replacing the word detected in said detecting step with the synonym selected in said selecting step; and
    in an outputter, outputting said text information after being replaced in said replacing step as said text information for voice synthesis.

* * * * *